United States Patent Office 3,164,611
Patented Jan. 5, 1965

3,164,611
OXIDATION OF PRIMARY AND SECONDARY ALCOHOLS TO THE CORRESPONDING CARBONYL COMPOUNDS USING A TERTIARY AMINE CHROMIUM TRIOXIDE COMPLEX
Lewis H. Sarett, Princeton, N.J., assignor to Merck & Co., Inc., Rahway, N.J., a corporation of New Jersey
No Drawing. Filed July 26, 1956, Ser. No. 600,163
13 Claims. (Cl. 260—340.9)

This invention relates to a novel process for the oxidation of chemical compounds, and more particularly to an improved method for the oxidation of primary and secondary alcohols to the corresponding carbonyl compounds.

This application is a continuation-in-part application of my application Serial No. 263,016, filed December 22, 1951, now abandoned, and my copending application Serial No. 292,985, filed June 11, 1952, now abandoned.

While various methods are known for effecting the oxidation of chemical compounds, these methods suffer from the serious disadvantage in that they very often cause undesirable side reactions. For example, in oxidizing primary and secondary alcohols to the corresponding carbonyl compounds, frequently the oxidizing agents will attack unsaturated bonds, or oxidize the compound beyond the desired stage. Further, many of the known processes employ acid reagents which attack acid-sensitive portions of compounds being oxidized.

It is an object of my present invention to provide a novel process for effecting chemical oxidations. It is another object to provide a method of oxidizing chemical compounds under alkaline conditions. It is a further object to provide an improved method of oxidizing primary and secondary alcohols to the corresponding carbonyl compounds. Other objects will be apparent from the detailed description hereinafter provided.

In accordance with my invention, I have found that complexes formed by reacting an organic base with chromium trioxide may be employed as agents in the oxidation of chemical compounds having an oxidizable functional group. Thus, the complexes formed by reacting chromium trioxide with organic bases such as pyridine, γ-picoline, β-picoline, lutidines, quinoline, diethyl formamide and the like, function as mild oxidizing agents and are conveniently employed in oxidizing chemical compounds.

In carrying out oxidations with these complexes, the organic compound being oxidized is intimately contacted with the complex for sufficient time to effect the desired oxidation. Usually, I prefer to carry out the oxidation by dissolving the organic compound in a suitable inert non-acidic solvent, such as benzene, toluene, pyridine and the like, adding thereto the organic base-chromium trioxide complex, agitating the reaction mixture to effect intimate contact of the reactants, and permitting the reaction mixture to stand for sufficient time at room temperature to complete the oxidation. Alternatively, as will be readily apparent to those skilled in the art, the compound to be oxidized may be dissolved in an organic base, and the chromium trioxide may then be added forming the organic base-chromium trioxide complex in situ. Since the formation of the complex is an exothermic reaction, care must be taken in applying this method to the oxidation of heat sensitive compounds.

These organic base-chromium trioxide complexes are particularly useful oxidizing agents for effecting the oxidation of alcohols having at least one hydrogen atom attached to the carbon atom bearing the hydroxyl substituent, i.e., primary and secondary alcohols, to the corresponding carbonyl compounds. Thus, primary alcohols are oxidized to aldehydes, and secondary alcohols are converted to ketones.

This method of oxidizing alcohols to the corresponding carbonyl compounds is generally applicable to all primary and secondary alcohols. Examples of such alcohols that might be mentioned are aliphatic alcohols such as alkanals, alkenols, alkinols, polyhydric alkanols, polyhydric alkenols and polyhydric alkinols; aralkyl alcohols; aralkenyl alcohols; aralkinyl alcohols; alicyclic alcohols such as cycloalkyl, cycloalkenyl, cycloalkinyl, spiran, terpene, polyterpene, steroid and carotenoid alcohols; alicyclic alkyl alcohols; alicyclic alkenyl alcohols; alicyclic alkinyl alcohols; heterocyclic alcohols; heterocyclic alkyl alcohols; heterocyclic alkenyl alcohols; heterocyclic alkinyl alcohols; and the like.

The primary and secondary alcohols reduced by the methods of the present invention can be unsubstituted alcohols or alcohols containing substituents such as halo, amino, nitro carbonyl, sulfonic acid groups, and the like.

Specific examples of such alcohols that might be mentioned are ethanol, propanol, butanol, farnesol, citronellol, geraniol, glycol, propylene glycol, glycerol, β-phenylethanol, cyclopropanol, cyclobutanol, cyclopentanol, cyclohexanol, cyclooctanol, benzylalcohol, menthol, carnomenthol, cyclohexylethanol, p-nitrobenzyl alcohol, 1,2-diphenyl ethanol, 4,4'-dimethoxydiphenyl carbonol, 3-hydroxy-1,3-diphenyl propene, trichlorenthanol, 4,4' dihydroxy diphenyl carbinol, methyl 3-pyridylcarbinol, furfuryl alcohol, codeine, biotin, scopolamine, atropine, hydroxy proline and cyclopentanol. The process of the present invention is particularly useful in oxidizing cyclopentanopolyhydrophenanthrene alcohols such as steroids to the corresponding carbonyl compounds. Thus, sterols such as cholesterol, cholestanol, epicholesterol, coprostanol, epicoprostanol, ergosterol, stigmasterol, and lumisterol, bile acids such as cholic acid, desoxycholic acid, lithocholic acid, 3-epidesoxycholic acid, bisnorcholic acid, cholanic acid, allocholanic acid and bufocholanic acid, heart poisons such as strophanthidin, isostrophanthidin, periplogenin, 17-isoperiplogenin, digitoxigenin, sarmentogenin, scillariden and bufotalin, sapogenins such as tigogenin, sarsasapogenin, similogenin, neotigogenin, samogenin and hecogenin, sex hormones such as estriol, estrane, equilenin, equilin, androsterone and epiandrosterone, can be oxidized by the base-chromium trioxide complexes to produce the corresponding carbonyl compounds. In addition to these steroids other saturated or unsaturated derivatives of such steroids such as primary and secondary alcohols of estranes, androstanes, etiocholanes, pregnanes, cholanes, cholestanes, spirostanes, isoallospirostanes, and the like, can be oxidized by the processes of the present invention. Also, alcohols of the dodecahydrophenanthrene series are conveniently oxidized by the processes of the present invention.

In accordance with a preferred embodiment of my invention, I have found that complexes prepared by reacting chromium trioxide with tertiary amines are especially valuable oxidizing agents. In particular, I have found the pyridine-chromium trioxide complex, which has been described by Sisler et al. in the Journal of the American Chemical Society, 70, 3828, (1948) to be of outstanding value in effecting the oxidation of primary and secondary alcohols to the corresponding carbonyl compounds.

The pyridine-chromium trioxide complex is readily prepared by reacting chromium trioxide with pyridine. Since this complex is relatvely insoluble in pyridine, it can be obtained in solid form by reacting chromium trioxide with a moderate excess of pyridine. Thus, by reacting about one gram of chromium trioxide with 10 cc. of pyridine, the solid complex is precipitated and, if desired, may be separated in accordance with conventional procedures. By reacting chromium trioxide with a large excess of pyridine, for example, by adding about one gram of chromium trioxide to 75 cc. of pyridine, a solution of pyridine-chromium trioxide complex in pyridine is obtaned. Although the complex which may be prepared in solid form as indicated above, may be employed as the oxidizing agent, I have usually found it most convenient to utilize it in the form of a suspension or solution in pyridine.

In carrying out the oxidation of alcohols pursuant to the preferred embodiment of my invention, the alcohol is dissolved in a suitable inert non-acidic solvent and the pyridine-chromium trioxide complex added as a suspension or solution in pyridine. Various solvents such as benzene, toluene, picoline and the like are suitable as solvents for the alcohol, although I usually find that pyridine is most satisfactory. After intimately contacting the resulting reaction mixture of the alcohol with the pyridine-chromium trioxide complex, it is permitted to stand, preferably at room temperature, for sufficient time to insure completion of the oxidation. This reaction period is not critical and I usually find that a period of 10–16 hours is satisfactory, although the time will vary depending upon the particular alcohol being oxidized. The pH of the reaction mixture is in the range of about 7–9. After the oxidation is complete, the carbonyl compound is recovered in accordance with methods known in the art. For example, the reaction mixture may be diluted with water and the product may be recovered by extraction with a suitable water immiscible solvent. The product obtained by evaporation of the solvent extracts can then be purified, if desired, by recrystallization from suitable solvents.

The pyridine-chromium trioxide complex is very valuable as an oxidizing agent since it is very selective and can be employed in oxidizing compounds having several oxidizable functional groups to prepare oxidized derivatives unobtainable by known methods. For example, steroid compounds having a polyhydroxylated side chain at the 17-position may be oxidized to obtain the corresponding compound having a ketol side chain. Thus, 3,21-diacetoxy-17-hydroxy-11,20-diketo pregnane can be obtained by reacting 3,21-diacetoxy-11-keto-17,20-hydroxy pregnane with pyridine-chromium trioxide complex. Also, unsaturated steroid alcohols can be converted to the corresponding unsaturated steroid ketones by reaction with pyridine-chromium trioxide complex without effecting the unsaturated linkage. For example, $\Delta^{8(9),22}$-3-acetoxy-7,11-dihydroxy ergostadiene is oxidized to $\Delta^{8(9),22}$-3-acetoxy-7,11-diketo-ergostadiene. Similarly, unsaturated hydroxy phenanthrene compounds can be oxidized with the pyridine-chromium trioxide complex to the corresponding unsaturated keto phenanthrene compounds.

As indicated above, a particular feature of my invention is that it provides a means for oxidizing chemical compounds under alkaline conditions thereby avoiding the difficulties encountered with the use of acidic oxidizing agents. It was indeed entirely unexpected to find that the organic base-chromium trioxide complexes could be utilized as oxidizing agents since chromium trioxide had always been employed as an oxidizing agent under acid conditions.

The following examples are presented to illustrate specific embodiments of my invention:

EXAMPLE 1

*Preparation of 3-acetoxy-11,20-diketo pregnane by the oxidation of 3-acetoxy-11-keto-20-hydroxy pregnane*

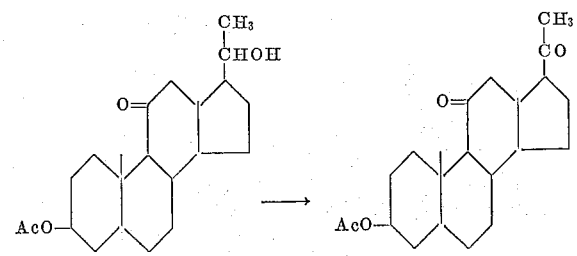

To a solution of 17 mg. of 3-acetoxy-11-keto-20-hydroxy pregnane in 0.3 cc. of dry pyridine was added 75 mg. of pyridine-chromium trioxide complex. The mixture, after standing 36 hours at room temperature, was poured into ether and water, and the ether layer was washed with dilute aqueous hydrochloric acid. Concentration of the ethereal solution and crystallization of the residue from ether gave 3-acetoxy-11,20-diketo-pregnane, M.P. 131° C.

EXAMPLE 2

*Preparation of 3,21-diacetoxy-17-hydroxy-11,20-diketo pregnane from 3,21-diacetoxy-11-keto-17,20-dihydroxy pregnane*

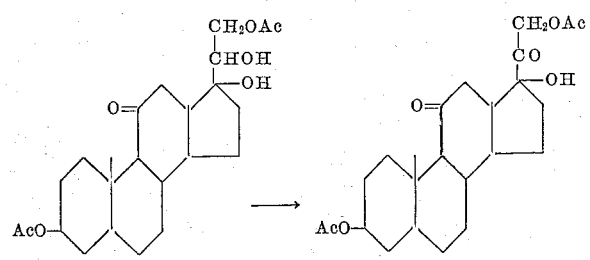

One gram of chromic anhydride was treated with 10 cc. of dry pyridine with cooling. To the suspension of pyridine-chromium trioxide complex was then added 1.0 g. of 3,21-diacetoxy-11-keto-17,20-dihydroxypregnane. After standing at room temperature 22 hours, the mixture was poured into water and extracted with chloroform. Concentration of the chloroform solution gave a residue containing 3,21-diacetoxy-17-hydroxy-11,20-diketopregnane which was separated by crystallization of the pregnane compound from alcohol.

EXAMPLE 3

*Preparation of n-butyraldehyde from N-butyl alcohol*

$$CH_3CH_2CH_2CH_2OH \rightarrow CH_3CH_2CH_2CHO$$

A suspension of pyridine-chromium trioxide complex in pyridine was prepared by adding 200 mg. of chromic anhydride to 2.0 cc. of pyridine. A solution of 0.12 cc. of n-butyl alcohol in 1.5 cc. of pyridine was added and the mixture allowed to stand at room temperature overnight. Extraction with 5 cc. of petroleum ether followed by washing of the organic layer with dilute aqueous hydrochloric acid gave a solution containing n-butyraldehyde. This compound was identified by shaking the extract with an aqueous acid solution of 2,4-dinitrophenylhydrazine. The 2,4-dinitrophenylhydrazone of butyraldehyde was thus obtained, M.P. 122–123° C.

EXAMPLE 4

*Preparation of $\Delta^{8(9),22}$-3-acetoxy-7,11-diketo ergostadiene from $\Delta^{8(9),22}$-3-acetoxy-7,11-dihydroxy-ergostadiene*

To a solution-suspension of 1.00 g. of $\Delta^{8(9),22}$-3-acetoxy- 7,11-dihydroxy-ergostadiene, which may be prepared as described in copending application Serial No. 215,026, filed March 10, 1951, in 10 cc. of pyridine was added (without cooling) a solution of pyridine-chromium trioxide complex prepared by the addition of 1.05 g. of chromium trioxide to 75 ml. of pyridine. This mixture was allowed to stand at room tempertaure for 26 hours with occasional shaking. The reaction mixture was then poured into 400 ml. ice-water, and the resulting suspension filtered, using filter-cel to prevent clogging. The filtrate was made strongly acid with dilute sulfuric acid, and a brown flocculent precipitate collected on a glass filter.

The residue was extracted with ether. The ether solution was washed with 50 cc. water, twice with 40 cc. 5% sodium bicarbonate, and three times with 100 cc. water, and then evaporated to dryness. The residual solid was recrystallized from absolute ethanol to give substantially pure $\Delta^{8(9),22}$-3-acetoxy-7,11-diketo ergostadiene, M.P. 132—133° C.

EXAMPLE 5

*Preparation of 4b-methyl-7-ethylenedioxy-1,2,3,4,4a,4b,5, 6,7,8,10,10a-dodecahydrophenanthrene-1,4-dione, 4b-methyl-7-ethylenedioxy-1,2,3,4,4a,4b,5,6,7,8,10,10a-dodecahydrophenanthrene-1-one-4-ol, and 4b-methyl-7-ethylenedioxy-1,2,3,4,4a,4b,5,6,7,8,10,10a-dodecahydrophenanthrene-1-ol-4-one*

Three grams of 4b-methyl-7-ethylenedioxy-1,2,3,4,4a, 4b,5,6,7,8,10,10a-dodecahydrophenanthrene-1,4-diol, which may be prepared as described in copending application Serial No. 286,808 filed May 8, 1952, in 30 cc. of dry pyridine was combined with 3.0 g. of chromium trioxide in 30 cc. of pyridine and allowed to stand at room temperature overnight. Dilution with water, followed by extraction with benzene-ether, washing, drying, concentration and vacuum drying gave 2.90 g. of crude, non-crystalline product.

When this material was chromatographed over 90 g. of alkaline alumina, the benzene eluate gave 0.48 g. of 4b-methyl-7-ethylenedioxy-1,2,3,4,4a,4b,5,6,7,8,10,10a-dodecahydrophenanthrene-1,4-dione, M.P. 113–118° C. With ether and ether-chloroform (1:1), there was eluted first 0.20 g. of 4b-methyl-7-ethylenedioxy-1,2,3,4,4a,4b,5, 6,7,8,10,10a-dodecahydrophenanthrene-1-one-4-ol, M.P. 216–219° C. and finally 2.38 g. of 4b-methyl-7-ethylenedioxy-1,2,3,4,4a,4b,5,6,7,8,10,10a-dodecahydrophenanthrene-1-ol-4-one, M.P. 130–138° C.

EXAMPLE 6

*Preparation of 4b-methyl-7-ethylenedioxy-1,2,3,4,4a,4b,5, 6,7,8,10,10a-dodecahydrophenanthrene-1-ol-4-one-1-acetate*

Two grams of chromium trioxide was dissolved in 20 cc. of dry pyridine with cooling. To the resulting suspension of orange complex was added a solution of 2.00 g. of 4b-methyl-7-ethylenedioxyl-1,2,3,4,4a,4b,5,6,7,8,10,10a-dodecahydrophenanthrene-1,4-diol-1-acetate, which may be prepared as described in copending application Serial No. 290,826, filed May 29, 1952, now abandoned, in 20 cc. of dry pyridine. The reaction flask was stoppered, the contents were mixed thoroughly by agitation and allowed to stand overnight. The reaction mixture was poured into 100 cc. of water and extracted with three 100 cc. portions of benzene. Filtration of the emulsions through diatomaceous earth was necessary to obtain separation of the extracts. The benzene solutions were combined, washed with water, dried over anhydrous magnesium sulfate and concentrated. After drying under high vacuum to remove pyridine, the residue was crystallized from ether. Two recrystallizations from ether gave 4b-methyl-7-ethylenedioxy-1,2,3,4,4a,4b,5,6,7,8,10,10a-dodecahydrophenanthrene-1-ol-4-one-1-acetate melting at 143–144.5° C.

EXAMPLE 7

*Preparation of 4b-methyl-7-ethylenedioxy-1,2,3,4,4a,4b,5, 6,7,8,10,10a-dodecahydrophenanthrene-1,4-dione by the chromium trioxide-pyridine oxidation of 4b-methyl-7-ethylenedioxy-1,2,3,4,4a,4b,5,6,7,8,10,10a-dodecahydrophenanthrene-1-one-4-ol*

A solution of 3.12 g. of 4b-methyl-7-ethylenedioxy-1,2, 3,4,4a,4b,5,6,7,8,10,10a-dodecahydrophenanthrene-1-one-4-ol, prepared as described in copending application Serial No. 286,808, filed May 8, 1952, now abandoned, in 30 cc. of pyridine was combined with 3.1 g. of chromium trioxide in 30 cc. of pyridine. The reaction flask was stoppered, the contents mixed thoroughly and allowed to stand at room temperature overnight. The reaction mixture was poured into water and extracted with three portions of benzene-ether (1:1) with filtration through diatomaceous earth to break the emulsions. After washing with water, the combined organic solution was dried over anhydrous magnesium sulfate and concentrated with final drying of the residue under high vacuum. Crystallization from ether gave 4b-methyl-7-ethylenedioxy-1,2,3,4,4a4b,5,6,7,8, 10,10a-dodecahydrophenanthrene-1,4-dione, M.P. 117–121° C.

EXAMPLE 8

*Preparation of 4b-methyl-7-ethylenedioxy-1,2,3,4,4a,4b,5, 6,7,8,10,10a-dodecahydrophenanthrene-1-4-dione*

A solution of 0.182 g. of 4b-methyl-7-ethylenedioxy-1,2,3,4,4a,4b,5,6,7,8,10,10a-dodecahydrophenanthrene-1-ol-4-one in 2 cc. of pyridine was oxidized with 0.20 g. of chromium trioxide in 2 cc. of pyridine at room temperature overnight. After dilution with water and extraction with benzene, there was obtained a non-crystalline product. On standing, an ether solution of this material deposited crystals, M.P. 135–145° C.

Several recrystallizations from ether yielded 4b-methyl-7-ethylenedioxy-1,2,3,4,4a,4b,5,6,7,8,10,10a-dodecahydrophenanthrene-1,4-dione, melting point 146–8° C.

EXAMPLE 9

*Preparation of $\Delta^{8,14}$-dehydro-9(?)-17a-hydroxy-11-dehydrocorticosterone acetate*

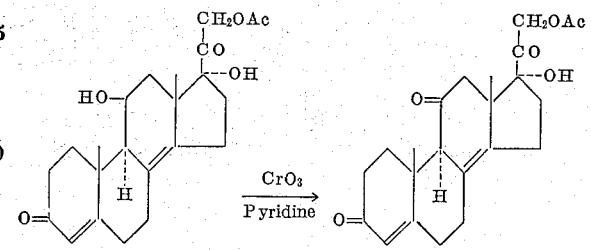

A solution of 6.66 g. (0.0666 M) of chromium trioxide in 6.66 ml. of water was cooled to below 10° and cautiously diluted with 10.0 ml. of pyridine with swirling and cooling. This solution was added dropwise with stirring over a 3–4 minute period to a cooled solution of 8.05 g. (0.020 M) of $\Delta^{8(14)}$-dehydro-9(?)-17a-hydroxy corticosterone 21-acetate ein 80 ml. of pyridine. The reaction mixture was allowed to warm to room temperature and stood for eighteen and one-half hours. At this time, 750 ml. of water and 10 g. of diatomaceous earth was added, the mixture thoroughly agitated and then filtered through a cake of diatomaceous earth. The flask and funnel were rinsed with 50 ml. of water and seven 125 ml. portions of ethyl acetate. The filtrate was transferred to a separatory funnel, the layers separated, and the aqueous layer extracted with an additional 250 ml. of ethyl acetate. The combined ethyl acetate layers were then washed with three 250 ml. portions of water, four 250 ml. portions of 1.25 N hydrochloric acid, three 250 ml. portions of water and one 250 ml. portion of saturated salt solution, then filtered through a cake of anhydrous magnesium sulfate. After removal of the solvent, the pale yellow crystalline residue weighed 7.57 g. One recrystallization from ethyl acetate afforded 5.79 g. of substantially pure Δ$^{8(14)}$-dehydro-9(?)-17a-hydroxy - 11 - dehydrocorticosterone acetate. M.P. 227, 231° (micro block), λ max. 2380 A, $\epsilon_{1cm.}^{1\%}$ 408, ε mal. 16.350

EXAMPLE 10

*Preparation of 2-methoxy-3-keto-tetrahydropyran*

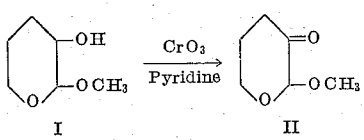

The oxidizing reagent was made by slowly adding 5 gm. CrO$_3$, with constant swirling and cooling, to 50 ml. pyridine. 5 gm. of 2-methoxy-3-hydroxy-tetrahydropyran (I) in 50 ml. pyridine added to the reagent with cooling, and the reaction mixture allowed to stand 48 hours. At the end of this time 100 ml. H$_2$O is added to the reaction flask, and the mixture saturated with NaCl. The mixture is extracted several times with ether, the extract dried (Na$_2$SO$_4$), and the excess solvent removed under vacuum. Reduced pressure distillation of the product yields a fraction showing strong absorption in the infra-red range associated with carbonyl functions, consistent with 2-methoxy-3-keto-tetrahydropyran (II).

EXAMPLE 11

*Preparation of methyl-3-acetoxy-12-keto cholanate*

To a suspension of pyridine-chromium trioxide complex, prepared by adding one gram of chromium trioxide to 10 ml. of pyridine, is added with stirring 1 g. of methyl 3-acetoxy desoxycholate. After standing at room temperature for 22 hours, the resulting mixture is poured into water and extracted with chloroform. Concentration of the chloroform solution and crystallization of the resulting residue from ether affords methyl 3-acetoxy-12-ketocholanate.

EXAMPLE 12

*Preparation of cholestane-2-one*

To a suspension of pyridine-chromium trioxide complex, prepared by adding one gram of chromium trioxide to 10 ml. of pyridine, is added with stirring 1 g. of cholestane-2-ol. After standing at room temperature for 22 hours, the resulting mixture is poured into water and extracted with chloroform. Concentration of the chloroform solution and crystallization of the resulting residue from ether affords cholestane-2-one.

EXAMPLE 13

*Preparation of methyl 7,12-diketocholanate*

When methyl 7,12-dihydroxycholanate is oxidized with pyridine-chromium trioxide complex and the resulting oxidation product is chromatographed over acid-washed alumina following the procedures described in Example 5, methyl 7,12-diketocholanate is obtained.

EXAMPLE 14

*Preparation of Δ$^4$-cholestene-3-one-6β-ol*

When cholesterol is oxidized with pyridine-chromium trioxide complex and the resulting oxidation product is chromatographed over acid-washed alumina following the procedures described in Example 5, Δ$^4$-cholestene-3-one-6β-ol is obtained.

EXAMPLE 15

*Preparation of allopregnane-3β,5α-diol-6-one-3-acetate*

When allopregnane-3β,5α,6β-triol-3-acetate is oxidized with pyridine-chromium trioxide complex and the resulting oxidation product is chromatographed over acid-washed alumina following the procedure described in Example 5, allopregnane-3β,5α-diol-6-one-3-acetate is obtained.

EXAMPLE 16

*Preparation of Δ$^{5,17(20)}$-pregnadiene-3β-ol-21-ol-3-acetate*

To a suspension of pyridine-chromium trioxide complex, prepared by adding one gram of chromium trioxide to 10 ml. of pyridine, is added with stirring 1 g. of Δ$^{5,17(20)}$-pregnadiene-3β,21-diol-3-acetate. After standing at room temperature for 22 hours, the resulting mixture is poured into water and extracted with chloroform. Concentration of the chloroform solution, and crystallization of the resulting residue from ether affords Δ$^{5,17(20)}$-pregnadiene-3β-ol-21-ol-3-acetate.

EXAMPLE 17

*Preparation of pregnane-3α,17α,21-triol-11,20-dione-3,21-diacetate*

When pregnane-3α,17α,20β,21-tetrol-11-one-3,21-diacetate is oxidized with pyridine-chromium trioxide complex and the resulting oxidation product is chromatographed over acid-washed alumina following the procedures described in Example 5, pregnane 3α,17α,21-triol-11,20-dione-3,21-diacetate is obtained.

EXAMPLE 18

*Preparation of 5α-spirostan-3,12-dione*

To a suspension of pyridine-chromium trioxide complex, prepared by adding one gram of chromium trioxide to 10 ml. of pyridine, is added with stirring 1 g. of hecogenin. After standing at room temperature for 22 hours, the resulting mixture is poured into water and extracted with chloroform. Concentration of the chloroform solution, and crystallization of the resulting residue from ether affords 5α-spirostan-3,12-dione.

EXAMPLE 19

*Preparation of 5-pregnene 3β-ol-7-one*

To a suspension of pyridine-chromium trioxide complex, prepared by adding one gram of chromium trioxide to 10 ml. of pyridine, is added with stirring 1 g. of 5-pregnene-3β,7-diol. After standing at room temperature for 22 hours, the resulting mixture is poured into water and extracted with chloroform. Concentration of the chloroform solution and crystallization of the resulting residue from ether affords 5-pregnene 3β-ol-7-one.

EXAMPLE 20

*Preparation of 4-androstene-3,17-dione*

To a suspension of pyridine-chromium trioxide complex, prepared by adding one gram of chromium trioxide to 10 ml. of pyridine, is added with stirring 1 g. of testosterone. After standing at room temperature for 22 hours, the resulting mixture is poured into water and extracted with chloroform. Concentration of the chloroform solution and crystallization of the resulting residue from ether affords 4-androstene-3,17-dione.

EXAMPLE 21

*Preparation of etiocholane-3,11,17-trione*

To a suspension of pyridine-chromium trioxide complex prepared by adding one gram of chromium trioxide to 10 ml. of pyridine, is added with stirring 1 g. of etiocholane-3α-ol-11,17-dione. After standing at room temperature for 22 hours, the resulting mixture is poured into water and extracted with chloroform. Concentration of chloroform solution and crystallization of the resulting residue from ether affords etiocholane-3,11,17-trione.

EXAMPLE 22

*Preparation of β-phenylacetaldehyde*

To a suspension of pyridine-chromium complex prepared by adding 5 g. of chromium trioxide to 50 ml. of pyridine is added with stirring 5 g. of β-phenylethanol. After standing at room temperature for 22 hours, the resulting reaction mixture is poured into water and extracted with ether. Concentration of the resulting ether extract and distillation of the resulting residue affords β-phenylacetaldehyde.

EXAMPLE 23

Preparation of farnesaldehyde

When farnesyl alcohol is oxidized with pyridine-chromium trioxide complex and the resulting oxidation product is chromatographed over acid washed alumina following the procedures described in Example 5, farnesaldehyde is obtained.

EXAMPLE 24

Preparation of p-nitrobenzaldehyde

To a suspension of pyridine-chromium trioxide complex, prepared by adding one gram of chromium trioxide to 10 ml. of pyridine, is added with stirring 1 g. of p-nitrobenzyl alcohol. After standing at room temperature for 22 hours, the resulting mixture is poured into water and extracted with chloroform. Concentration of the chloroform solution and crystallization of the resulting residue from ether affords p-nitrobenzaldehyde.

EXAMPLE 25

Preparation of desoxybenzoin

When 1,2-diphenyl-ethanol is oxidized with pyridine-chromium trioxide complex and the resulting oxidation product is chromatographed over acid-washed alumina following the procedures described in Example 5, desoxybenzoin is obtained.

EXAMPLE 26

Preparation of 4,4'-dimethoxy benzophenone

To a suspension of pyridine-chromium trioxide complex prepared by adding one gram of chromium trioxide to 10 ml. of pyridine, is added with stirring 1 g. of 4,4'-dimethoxydiphenyl carbinol. After standing at room temperature for 22 hours, the resulting mixture is poured into water and extracted with chloroform. Concentration of the chloroform solution and crystallization of the resulting residue from ether affords 4,4'-dimethoxy benzophenone.

EXAMPLE 27

Preparation of benzophenone cyclooctanone

To a suspension of pyridine-chromium trioxide complex prepared by adding 5 g. of chromium trioxide to 50 ml. of pyridine is added with stirring 5 g. of carbinol cyclooctanol. After standing at room temperature for 22 hours, the resulting reaction mixture is poured into water and extracted with ether. Concentration of the resulting ether extract and distillation of the resulting residue affords benzophenone cyclooctanone.

EXAMPLE 28

Preparation of benzalacetophenone

To a suspension of pyridine-chromium trioxide complex, prepared by adding one gram of chromium trioxide to 10 ml. of pyridine, is added with stirring 1 g. of 3-hydroxy-13-diphenyl propene. After standing at room temperature for 22 hours, the resulting mixture is poured into water and extracted with chloroform. Concentration of the chloroform solution and crystallization of the resulting residue from ether affords benzalacetophenone.

EXAMPLE 29

Preparation of chloral

To a suspension of pyridine-chromium trioxide complex, prepared by adding one gram of chromium trioxide to 10 ml. of pyridine, is added with stirring 1 g. of trichlorethanol. After standing at room temperature for 22 hours, the resulting mixture is poured into water and extracted with chloroform. Concentration of the chloroform solution and crystallization of the resulting residue from ether affords chloral.

EXAMPLE 30

Preparation of 4,4'-dihydroxy benzophenone

To a supension of pyridine-chromium trioxide complex, prepared by adding one gram of chromium trioxide to 10 ml. of pyridine, is added with stirring 1 g. of 4,4'-dihydroxy diphenyl carbinol. After standing at room temperature for 22 hours, the resulting mixture is poured into water and extracted with chloroform. Concentration of the chloroform solution and crystallization of the resulting residue from ether affords 4',4'-dihydroxy benzophenone.

EXAMPLE 31

Preparation of 3-acetylpyridine

To a suspension of pyridine-chromium trioxide complex prepared by adding 5 g. of chromium trioxide to 50 ml. of pyridine is added with stirring 5 g. of methyl 3-pyridylcarbinol. After standing at room temperature for 22 hours, the resulting reaction mixture is poured into water and extracted with ether. Concentration of the resulting ether extract and distillation of the resulting residue affords 3-acetylpyridine.

Various changes and modifications may be made in carrying out the present invention without departing from the spirit and scope thereof. Insofar as these changes and modifications are within the purview of the annexed claims, they are to be considered as part of my invention.

What is claimed is:

1. A process for preparing n-butyraldehyde which comprises intimately contacting n-butyl alcohol with pyridine-chromium trioxide complex at a pH in excess of 7.0 and recovering n-butyraldehyde from the resulting reaction mixture.

2. A process for preparing 3 - acetoxy - 11,20 - diketopregnane which comprises intimately contacting 3-acetoxy-11-keto-20-hydroxypregnane with pyridine chromium trioxide complex at a pH in excess of 7.0 and recovering 3-acetoxy-11,20-diketo-pregnane from the resulting reaction mixture.

3. A process for preparing 3,21-diacetoxy-17-hydroxy-11,20-diketo pregnane which comprises intimately contacting 3,21 - diacetoxy-11-keto-17,20-dihydroxypregnane with pyridine chromium trioxide complex at a pH in excess of 7.0 and recovering 3,21-diacetoxy-17-hydroxy-11,20-diketo-pregnane from the resulting reaction mixture.

4. A process for preparing $\Delta^{8(9),22}$-3-acetoxy-7,11-diketoergostadiene which comprises intimately contacting $\Delta^{8(9),22}$-3-acetoxy - 7,11 - dihydroxyergostadiene with pyridine chromium trioxide complex at a pH in excess of 7.0 and recovering $\Delta^{8,(9),22}$-3-acetoxy-7,11-diketoergostadiene from the resulting reaction mixture.

5. A process for preparing 4b-methyl-7-ethylenedioxy-1,2,3,4,4a,4b,5,6,7,8,10,10a - dodecahydrophenanthrene-1,4-dione, 4b-methyl-7-ethylenedioxy - 1,2,3,4,4a,4b,5,6,7,8,10,10a - dodecahydrophenanthrene - 1 - one - 4 - ol, and 4b-methyl-7-ethylenedioxy - 1,2,3,4,4a,4b,5,6,7,8,10,10a-dodecahydrophenanthrene-1-ol-4-one which comprises intimately contacting 4b-methyl-7-ethylenedioxy-1,2,3,4,4a,4b,5,6,7,8,10,10a - dodecahydrophenanthrene-1,4-diol with pyridine chromium trioxide complex at a pH in excess of 7.0 and recovering 4b-methyl-7-ethylenedioxy-1,2,3,4,4a,4b,5,6,7,8,10,10a - dodecahydrophenanthrene -1,4 - dione, 4b-methyl-7-ethylenedioxy - 1,2,3,4,4a,4b,5,6,7,8,10,10a-dedecahydrophenanthrene-1-one-4-ol and 4b - methyl-7-ethylenedioxy - 1,2,3,4,4a,4b,5,6,7,8,10,10a - dodecahydrophenanthrene-1-ol-4-one from the resulting reaction mixture.

6. A process for preparing 4b-methyl-7-ethylenedioxy-1,2,3,4,4a,4b,5,6,7,8,10,10a - dodecahydrophenanthrene-1-ol-4-one-1-acetate which comprises intimately contacting 4b - methyl - 7 - ethylenedioxy - 1,2,3,4,4a,4b,5,6,7,8,10,10a - dodecahydrophenanthrene - 1,4 - diol - 1 - acetate with pyridine-chromium trioxide complex at a pH in excess of 7.0 and recovering 4b-methyl-7-ethylenedioxy-1,2,3,4,4a,4b,5,6,7,8,10,10a - dodecahydrophenanthrene-1-ol-4-one-1-acetate from the resulting reaction mixture.

7. A process for preparing 4b-methyl-7-ethylenedioxy-1,2,3,4,4a,4b,5,6,7,8,10,10a - dodecahydrophenanthrene-1,4-dione which comprises intimately contacting 4b-methyl-7-ethylenedioxy - 1,2,3,4,4a,4b,5,6,7,8,10,10a - dodecahydrophenanthrene-1-one-4-ol with pyridine - chromium trioxide complex at a pH in excess of 7.0 and recovering 4b - methyl - 7 - ethylenedioxy - 1,2,3,4,4a,4b,5,6,7,8,10,10a-dodecahydrophenanthrene-1,4-dione from the resulting reaction mixture.

8. A process for preparing 4b-methyl-7-ethylenedioxy-1,2,3,4,4a,4b,5,6,7,8,10,10a - dodecahydrophenanthrene-1,4-dione which comprises intimately contacting 4b-methyl-7-ethylenedioxy - 1,2,3,4,4a,4b,5,6,7,8,10,10a - dodecahydrophenanthrene-1-ol-4-one with pyridine - chromium trioxide complex at a pH in excess of 7.0 and recovering 4b - methyl-7-ethylenedioxy - 1,2,3,4,4a,4b,5,6,7,8,10,10a-dodecahydrophenanthrene-1,4-dione from the resulting reaction mixture.

9. In the process of oxidizing an alcohol having at least one hydrogen atom attached to the carbon atoms bearing the hydroxyl substituent to the corresponding carbonyl compound, the improvement which comprises intimately contacting said alcohol at a pH in excess of 7 with a tertiary amine-chromium trioxide complex, wherein the tertiary amine is a member from the group consisting of pyridine, lower alkyl substituted pyridines, and benzo-substituted pyridines, and recovering the carbonyl compound from the resulting reaction mixture.

10. In the process of oxidizing an alcohol having at least one hydrogen atom attached to the carbon atom bearing the hydroxyl substituent to the corresponding carbonyl compound, the improvement which comprises intimately contacting said alcohol at a pH in excess of 7 with a pyridine-chromium trioxide complex, and recovering the carbonyl compound from the resulting reaction mixture.

11. The process as defined in claim 10 wherein the alcohol is an aliphatic compound.

12. The process as defined in claim 10 wherein the alcohol is a phenanthrene compound.

13. The process as defined in claim 10 wherein the alcohol is a cyclopentanopolyhydrophenanthrene compound.

References Cited by the Examiner
UNITED STATES PATENTS

| | | | |
|---|---|---|---|
| 2,246,341 | 6/41 | Bretschneider et al. | 260—397.3 |
| 2,256,500 | 9/41 | Serini et al. | 260—397.3 |
| 2,437,938 | 3/48 | Cislack et al. | 260—295.5 |
| 2,722,532 | 11/55 | Arth et al. | 260—340.9 |

OTHER REFERENCES

Sisler et al.: J. Am. Chem. Soc., 70, 3827–30 (1948).
Sisler et al.: J. Am. Chem. Soc., 75, 446–8 (1953).
Ser. No. 385,680, Varga et al. (A.P.C.), published April 1943.

IRVING MARCUS, *Primary Examiner.*

H. SURLE, H. J. LIDOFF, *Examiners.*